(12) United States Patent
Koie

(10) Patent No.: US 8,838,287 B2
(45) Date of Patent: Sep. 16, 2014

(54) VEHICULAR TRAVELING REGULATION DEVICE AND METHOD FOR CONTROLLING VEHICLE

(71) Applicant: Denso Corporation, Kariya (JP)

(72) Inventor: Yoshio Koie, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/833,857

(22) Filed: Mar. 15, 2013

(65) Prior Publication Data

US 2013/0282199 A1    Oct. 24, 2013

(30) Foreign Application Priority Data

Apr. 19, 2012  (JP) .................................. 2012-95559

(51) Int. Cl.
*G05D 1/00*     (2006.01)
*G08G 1/123*    (2006.01)
*G01C 21/00*    (2006.01)
*G06F 17/00*    (2006.01)
*B60W 30/14*    (2006.01)

(52) U.S. Cl.
CPC .............. *G06F 17/00* (2013.01); *B60W 30/14* (2013.01)
USPC ................................ 701/1; 340/990; 340/995

(58) Field of Classification Search
USPC ............... 701/1, 212, 202, 209; 340/990, 995
See application file for complete search history.

(56) References Cited

U.S. PATENT DOCUMENTS

| | | | | |
|---|---|---|---|---|
| 6,052,645 A * | 4/2000 | Harada | ........................ | 701/423 |
| 6,459,987 B1 * | 10/2002 | Krull et al. | .................... | 701/410 |
| 6,845,318 B1 * | 1/2005 | Moore et al. | .................. | 701/454 |
| 6,853,917 B2 * | 2/2005 | Miwa | ............................ | 701/467 |
| 2005/0043884 A1 * | 2/2005 | Atarashi | ....................... | 701/202 |
| 2006/0206261 A1 * | 9/2006 | Altaf et al. | ..................... | 701/209 |
| 2010/0138142 A1 * | 6/2010 | Pease | ............................ | 701/123 |
| 2013/0231861 A1 * | 9/2013 | Yokoyama et al. | ........... | 701/523 |

FOREIGN PATENT DOCUMENTS

| | | |
|---|---|---|
| JP | 2001-239854 A | 9/2001 |
| JP | 2006-327346 A | 12/2006 |
| JP | 2011-022136 A | 2/2011 |

* cited by examiner

*Primary Examiner* — Thomas G Black
*Assistant Examiner* — Tyler Paige

(57) ABSTRACT

A position determination unit determines whether a present position of a vehicle deviates from a predetermined range. A direction determination unit determines whether a traveling direction of the vehicle is along a return direction, which is toward the predetermined range, on determination of the position determination unit that the present position deviates from the predetermined range. A traveling regulation unit regulates traveling of the vehicle when the direction determination unit determines that the traveling direction is not along the return direction.

12 Claims, 3 Drawing Sheets

| DIRECTION | ANGLE |
|---|---|
| D1 | 140° |
| D2 | 140° |
| D3 | 140° |
| D4 | 130° |
| D5 | 130° |
| D6 | 110° |
| D7 | 90° |
| D8 | 85° |
| D9 | 70° |
| D10 | 45° |
| Da | 108° |

VEHICULAR TRAVELING REGULATION DEVICE AND METHOD FOR CONTROLLING VEHICLE

CROSS REFERENCE TO RELATED APPLICATION

This application is based on reference Japanese Patent Application No. 2012-95559 filed on Apr. 19, 2012, the disclosure of which is incorporated herein by reference.

TECHNICAL FIELD

The present disclosure relates to a vehicular traveling regulation device configured to regulate traveling of a vehicle. The present disclosure further relates to a method for controlling the vehicle.

BACKGROUND

For example, JP-A-2006-327346 discloses a conventional art to set a traveling allowable range from the present position of a vehicle to a destination and to impose regulation on traveling of the vehicle when the vehicle deviates from the traveling allowable range while the vehicle is traveling.

It is noted that, the above-described conventional art is unable to cause a driver of the vehicle to notice that the vehicle has deviated from the traveling allowable range, unless regulation is imposed on traveling of the vehicle when the vehicle deviates from the traveling allowable range. In addition, even when the driver notices that the vehicle has deviated from the traveling allowable range erroneously and tries to return the vehicle into the traveling allowable range, the above-described conventional art is unable to cause the driver to return the vehicle into the traveling allowable range promptly, since the regulation is already imposed on traveling of the vehicle.

SUMMARY

It is an object of the present disclosure to produce a vehicular traveling regulation device configured to return a vehicle into a predetermined range promptly, even when the vehicle has deviated from the predetermined range. It is another object of the present disclosure to produce a method for controlling the vehicle.

According to an aspect of the present disclosure, a vehicular traveling regulation device comprises a present position detection unit configured to detect a present position of a vehicle. The vehicular traveling regulation device further comprises a traveling direction detection unit configured to detect a traveling direction of the vehicle. The vehicular traveling regulation device further comprises a position determination unit configured to determine whether the present position, which is detected by the present position detection unit, deviates from a predetermined range. The vehicular traveling regulation device further comprises a direction determination unit configured to determine whether the traveling direction, which is detected by the traveling direction detection unit, is along a return direction, which is toward the predetermined range, on determination of the position determination unit that the present position deviates from the predetermined range. The vehicular traveling regulation device further comprises a traveling regulation unit configured to regulate traveling of the vehicle on determination of the direction determination unit that the traveling direction is not along the return direction.

According to another aspect of the present disclosure, a method for controlling a vehicle, the method comprises detecting a present position of the vehicle. The method further comprises detecting a traveling direction of the vehicle. The method further comprises determining whether the detected present position deviates from a predetermined range. The method further comprises determining whether the detected traveling direction is along a return direction, which is toward the predetermined range, on determination that the present position deviates from the predetermined range. The method further comprises regulating traveling of the vehicle on determination that the traveling direction is not along the return direction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
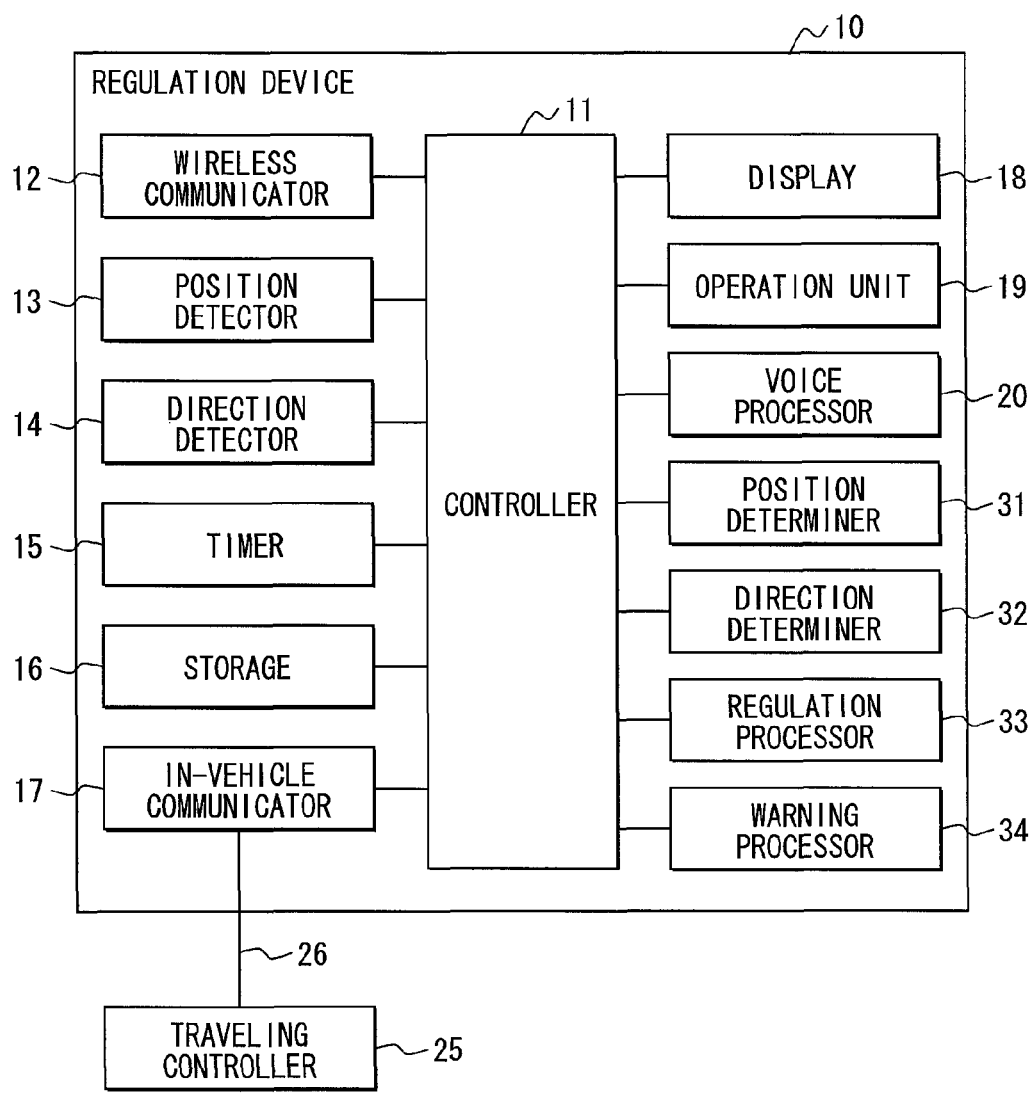
FIG. 1 is a block diagram showing a configuration of a vehicular traveling regulation device according to an embodiment.

As follows, an embodiment will be described with reference to drawings. As shown in FIG. 1, a vehicular traveling regulation device (traveling regulation device) 10 includes a control unit 11, a wireless communication unit 12, a present position detection unit 13, a traveling direction detection unit 14, a timer unit 15, a storage unit 16, an in-vehicle communication unit 17, a display unit 18, an operation unit 19, and a voice processing unit 20.

The control unit 11 is mainly configured with a microcomputer including a CPU, a ROM, and a RAM (none shown) and is configured to control operation of the traveling regulation device 10. The control unit 11 controls activation and de-activation of the traveling regulation device 10 in response to activation and de-activation of an ACC signal sent from an accessories switch device (ACC switch device) (not shown), respectively, and/or in response to activation and de-activation of an IG signal sent from an ignition switch device (IG switch) (not shown), respectively. The control unit 11 further causes the CPU to execute a control program thereby to produce, as a software program, a position determination processing unit 31, a direction determination processing unit 32, a traveling regulation processing unit 33, and a warning operation processing unit 34.

A wireless communication unit 12 establishes a wireless communication channel with a data source (not shown) outside of the vehicle, thereby to implement various kinds of data communications through the communication channel. The data source is, for example, a portable communication terminal and/or a data server of a service center. The present position detection unit 13 receives detection signals from various kinds of sensors, such as a geomagnetism sensor, a gyroscope, a speed sensor, a GPS receiver and the like, respectively. The present position detection unit 13 further detects the present position of the vehicle by complementing the detection signals to each other. The traveling direction detection unit 14 receives detection signals from various kinds of sensors, such as a direction sensor (not shown) and/or the like, thereby to detect the traveling direction of the vehicle.

The timer unit 15 is configured to retrieve information (time information) about time, such as the date, the present time, and/or an elapsed time. The timer unit 15 counts the number of pulses sent from a clock pulse generator (not shown), thereby to generate a unit time signal, which represents a unit time, when the count value reaches a reference value. The timer unit 15 generates a system time of the control unit 11 according to the generated unit time signal. The storage unit 16 is configured with a nonvolatile storage media, such as a hard disk drive and/or a flash memory, and is configured to store data, which is used by various kinds of computer programs.

The in-vehicle communication unit 17 is connected with a traveling control unit 25 through an interior communication network 26 and is configured to communicate with the traveling control unit 25 through the interior communication network 26. The traveling control unit 25 is connected with various kinds of devices, such as an engine control device, a brake control device, a transmission control device, and/or the like (not shown). The traveling control unit 25 is configured to receive various kinds of information from these devices, to process the received information, and to send the processed information as various kinds of vehicular traveling information about traveling operation of the vehicle. The control unit 11 is configured to cause the in-vehicle communication unit 17 to transmit a traveling regulation instruction signal to the traveling control unit 25 through the interior communication network 26. The traveling control unit 25 controls operation of the devices according to the traveling regulation instruction signal received from the control unit 11, thereby to impose regulation on traveling operation of the vehicle and to release the regulation.

The display unit 18 is configured with an LCD device and/or an EL device and is configured to indicate various kinds of information according to instruction signals from the control unit 11. The display unit 18 has a screen equipped with a touch-panel switch device having a sensing configuration to detect change in applied pressure, caused electromagnetic induction therein, and/or change in capacitance thereof. The operation unit 19 includes various kinds of switch devices equipped on the screen of the display unit 18. The various kinds of switch devices may include, for example, a touch-panel switch device, a mechanical switch device located around the display unit 18, and/or the like. The operation unit 19 sends an operation detection signal to the control unit 11 in response to operation of the various kinds of switch devices by a user. The control unit 11 analyzes the operation detection signal sent from the operation unit 19 and determines an operation content caused by the user, thereby to implement various kinds of processings according to the operation content.

The voice processing unit 20 is connected with a microphone and a speaker (none shown) and is configured with a voice input function and a voice output function. The voice processing unit 20 sends, as a voice input signal, voice received with the microphone to the control unit 11. The voice processing unit 20 further causes the speaker to emit voice according to the voice output signal sent from the control unit 11. The position determination processing unit 31 determines whether the present position of the vehicle, which is detected with the present position detection unit 13, deviates from a traveling allowable range (predetermined range) R. The traveling allowable range R may be set arbitrarily. The control unit 11 is configured to set the traveling allowable range R according to operation conducted by a user on the operation unit 19, a traveling allowable range set signal, which is retrieved from the data source outside of the vehicle through the wireless communication unit 12, and/or the like.

When the position determination processing unit 31 determines that the present position of the vehicle deviates from the traveling allowable range R, the direction determination processing unit 32 determines whether the traveling direction of the vehicle, which is detected with the traveling direction detection unit 14, is a return direction. The return direction is defined as a direction from the present position of the vehicle, which deviates from the traveling allowable range R, toward the traveling allowable range R or defined as a direction close to this direction. The direction determination processing unit 32 may employ various determination processings. For example, the direction determination processing unit 32 may determine the traveling direction of the vehicle to be the return direction when the traveling allowable range R exists on an extension line drawn from the present position of the vehicle in the traveling direction. Alternatively, the direction determination processing unit 32 may determine the traveling direction of the vehicle to be the return direction when the present position of the vehicle approaches (moves toward) the traveling allowable range R, i.e., when the present position of the vehicle moves toward the traveling allowable range R. More specifically, the direction determination processing unit 32 may determine the traveling direction to be the return direction when the present position of the vehicle at the time of the present determination is closer to the traveling allowable range R than the position of the vehicle at the time of the previous determination. These determination methods may be combined.

The direction determination processing unit 32 may determine whether an instantaneous value of the traveling direction of the vehicle, which is detected with the traveling direction detection unit 14, is in the return direction, when the position determination processing unit 31 determines that the present position of the vehicle deviates from the traveling allowable range R. Alternatively, the direction determination processing unit 32 may determine whether an average direction, which is an average value of multiple detection values of the traveling direction detected with the traveling direction detection unit 14, is in the return direction, after the position determination processing unit 31 determines that the present position of the vehicle deviates from the traveling allowable range R.

Figures 2A, 2B:
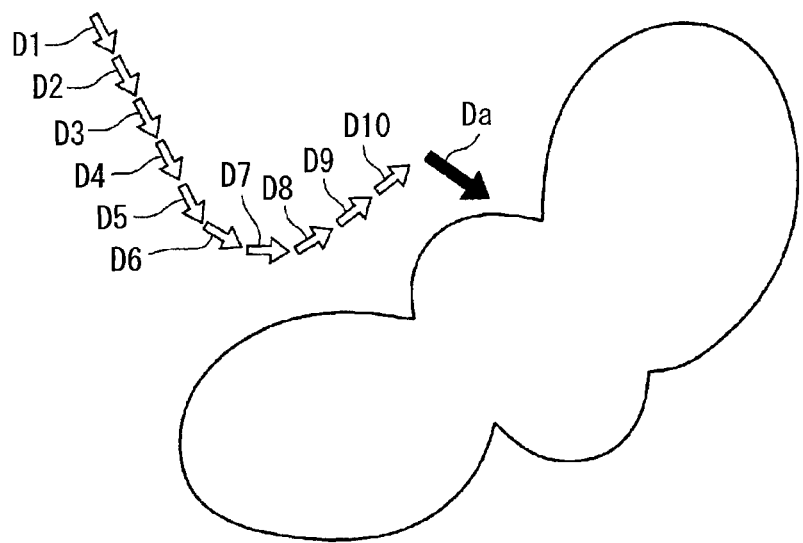
FIG. 2A is a schematic view showing one example of a relation between a traveling direction of a vehicle and a traveling allowable range.
FIG. 2B is a view showing one example of a detailed angle of each of the traveling directions in FIG. 2A and showing an average direction of the traveling directions.

More specifically, as shown in FIGS. 2A and 2B, the direction determination processing unit 32 may determine whether one of multiple detection values of the traveling directions D1 to D10 is in the return direction. More specifically, the direction determination processing unit 32 may determine whether, for example, the traveling direction D3, which is at the 140-degree relative to 0 degree in the north direction, is in the return direction. Alternatively, the direction determination processing unit 32 may determine whether an average direction Da, which is an average value of the detection values of the traveling directions D1 to D10, is in the return direction. These determination methods may be combined. In the example of FIG. 2A, for example, each of the traveling directions D9 and D10 is away from the traveling allowable range R. To the contrary, the average direction Da, which is the average value of the detection values of the traveling directions D1 to D10 including D9 and D10, is in the traveling allowable range R. Therefore, it may be estimated that the vehicle is toward the traveling allowable range R on determination that the average direction Da is toward the traveling allowable range R.

The traveling regulation processing unit 33 implement traveling regulation to regulate (restricts) traveling of the vehicle on determination of the direction determination processing unit 32 that the traveling direction of the vehicle is away from the return direction. Specifically, the traveling regulation processing unit 33 may implement the traveling regulation by, for example, decelerating the vehicle or by de-activating an engine of the vehicle after elapse of a predetermined time subsequent to the determination. The traveling regulation processing unit 33 releases the traveling regulation imposed on the vehicle, on determination of the direction determination processing unit 32 that the traveling direction of the vehicle is along the return direction. The traveling regulation processing unit 33 may not implement the traveling regulation immediately on determination of the direction determination processing unit 32 that the traveling direction of the vehicle is away from the return direction. Specifically, the traveling regulation processing unit 33 may implement the traveling regulation after elapse of a predetermined time subsequent to determination of the direction determination processing unit 32 that the traveling direction of the vehicle is away from the return direction.

The warning operation processing unit 34 implements a predetermined warning operation on determination of the position determination processing unit 31 that the present position of the vehicle deviates from the traveling allowable range R. Specifically, the warning operation processing unit 34 implements the warning operation, for example, by causing the voice processing unit 20 to emit voice representing that the vehicle deviates from the traveling allowable range R or by causing the display unit 18 to indicate a message representing that the vehicle deviates from the traveling allowable range R. The warning operation processing unit 34 may continue the warning operation until the present position of the vehicle, which is determined with the position determination processing unit 31, moves into the traveling allowable range R.

Figure 3:
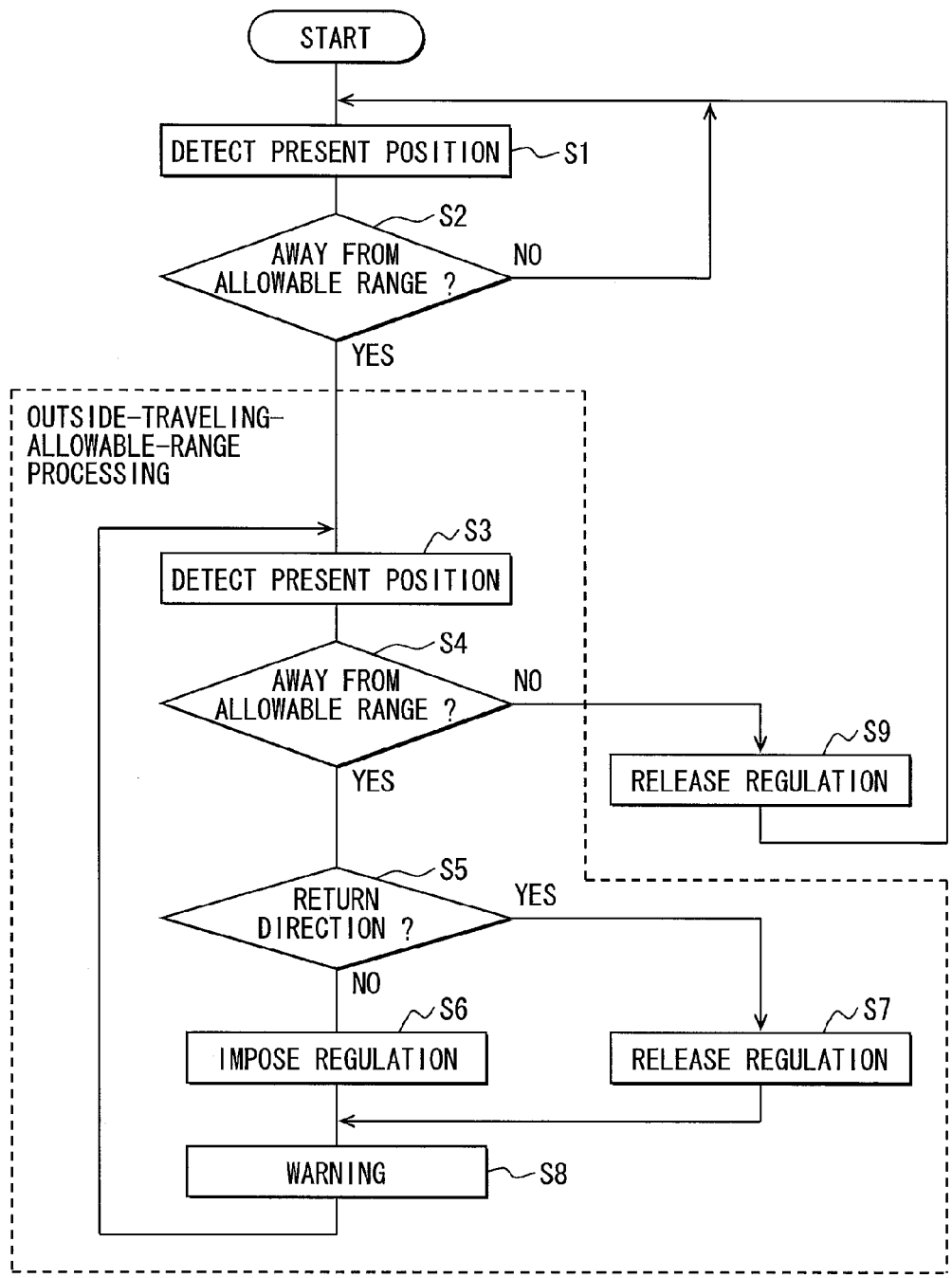
FIG. 3 is a flow chart showing operation of the vehicular traveling regulation device.

Subsequently, the operation of the traveling regulation device 10 will be described with reference to the flowchart shown in FIG. 3. The processings described below is executed by the control unit 11 of the traveling regulation device 10. The traveling regulation device 10 causes the present position detection unit 13 to detect the present position of the vehicle, when the vehicle starts traveling (step S1). Subsequently, the traveling regulation device 10 determines whether the detected present position of the vehicle deviates from the traveling allowable range R (step S2). The traveling regulation device 10 returns the processing to step S1 on determination that the detected present position does not deviate from the traveling allowable range R (step S2: NO). That is, the traveling regulation device 10 repeats determination whether the vehicle deviates from the traveling allowable range R, while the vehicle travels. Alternatively, the traveling regulation device 10 executes an outside-traveling-allowable-range processing, which starts from step S3, on determination that the detected present position deviates from the traveling allowable range R (step S2: YES).

The traveling regulation device 10 causes the present position detection unit 13 to detect the present position of the vehicle, in the beginning of the outside-traveling-allowable-range processing (step S3). Subsequently, the traveling regulation device 10 determines whether the detected present position of the vehicle deviates from the traveling allowable range R (step S4). The contents of steps S3 and S4 are the same as the contents of steps S1 and S2. Nevertheless, the objects of steps S3 and S4 are different from the objects of steps S1 and S2. Steps S3 and S4 are executed mainly to determine whether the vehicle, which has deviated from the traveling allowable range R once, returns into the traveling allowable range R. To the contrary, steps S1 and S2 are executed mainly to determine whether the vehicle, which is traveling within the traveling allowable range R, deviates from the traveling allowable range R.

The traveling regulation device 10 determines whether the traveling direction of the vehicle is along the return direction (step S5), on determination that the detected present position deviates from the traveling allowable range R (step S4: YES). The traveling regulation device 10 imposes regulation (restriction) on traveling of the vehicle (step S6) on determination that the traveling direction of the vehicle is not along the return direction (step S5: NO). Subsequently, the traveling regulation device 10 causes the processing to proceed to step S8. Alternatively, the traveling regulation device 10 releases the traveling regulation (traveling restriction) presently imposed on traveling of the vehicle (step S7) on determination that the traveling direction of the vehicle is along the return direction (step S5: YES). Subsequently, the traveling regulation device 10 causes the processing to proceed to step S8.

At step S8, the traveling regulation device 10 implements the warning operation. That is, the traveling regulation device 10 implements the warning operation, while the vehicle deviates from the traveling allowable range R, in both cases where regulation is imposed on traveling of the vehicle when the vehicle is not toward the traveling allowable range R and where regulation imposed on traveling of the vehicle is released when the vehicle is toward the traveling allowable range R. Thus, the traveling regulation device 10 causes the processing to proceed to step S3, with implementing the warning operation. That is, the traveling regulation device 10 continues the warning operation, when the traveling regulation device 10 once implements the warning operation in the outside-traveling-allowable-range processing, until the traveling regulation device 10 terminates the outside-traveling-allowable-range processing.

The traveling regulation device 10 terminates the outside-traveling-allowable-range processing on determination that the detected present position is within the traveling allowable range R (step S4: NO). Thus, the traveling regulation device 10 also terminates the warning operation being continued. The traveling regulation device 10 releases the traveling regulation, which is presently imposed on the vehicle (step S9), and causes the processing to proceed to step S1. The traveling regulation device 10 repeats the above-described processing until the vehicle stops when, for example, reaching a destination defined by route guidance. Specifically, the traveling regulation device 10 repeats the above-described processing until the signal from the accessories switch device and/or the ignition switch device of the vehicle is deactivated. The processing surrounded by the dotted line in FIG. 3 is the outside-traveling-allowable-range processing. That is, the outside-traveling-allowable-range processing includes steps S3 to S8.

According to the above-described embodiment, the traveling regulation device 10 determines whether the traveling direction of the vehicle is along the return direction, which is toward the traveling allowable range R, when the present position of the vehicle deviates from the traveling allowable range R. The traveling regulation device 10 further regulates (restricts) traveling of the vehicle when the traveling direction is not along the return direction, that is, when the vehicle does not move toward the traveling allowable range R. That is, according to the present embodiment, when the vehicle has deviated from the traveling allowable range R, regulation is imposed on traveling of the vehicle on condition that the vehicle does not move toward the traveling allowable range R, and regulation is not imposed on traveling of the vehicle on condition that the vehicle moves toward the traveling allowable range R. The present configuration does not impose regulation on traveling of the vehicle, even when the vehicle has deviated from the traveling allowable range R, as long as the vehicle is moving toward the traveling allowable range R. Thus, the present configuration enables the vehicle to return to the traveling allowable range R promptly.

In addition, the present configuration imposes regulation on traveling of the vehicle, in a condition where the vehicle deviates from the traveling allowable range R and where the traveling direction of the vehicle is not toward the traveling allowable range R. Therefore, the present configuration enables, for example, to prohibit theft of the vehicle and to restrict a region where the vehicle is movable. In addition, the traveling regulation device 10 determines that the traveling direction of the vehicle is along the return direction, in a case where the traveling allowable range R exists on the extension line drawn from the present position of the vehicle in the traveling direction and/or where the present position of the vehicle approaches (moves toward) the traveling allowable range R. Therefore, the traveling regulation device 10 enables the determination whether the traveling direction of the vehicle is along the return direction with sufficient accuracy.

In addition, the traveling regulation device 10 determines whether the traveling direction of the vehicle, which is detected at the time when the present position of the vehicle is determined to be deviating from the traveling allowable range R, is along the return direction. In addition, the traveling regulation device 10 determines whether the average direction is along the return direction. The average direction is the average value of detection values of multiple traveling directions detected after the present position of the vehicle is determined to be deviating from the traveling allowable range R. Thus, the traveling regulation device 10 determines whether the traveling direction of the vehicle is along the return direction with sufficient accuracy. In addition, even once imposing the traveling regulation on the vehicle, the traveling regulation device 10 releases the traveling regulation imposed on traveling of the vehicle, on determination that the traveling direction of the vehicle is along the return direction. The present configuration releases the traveling regulation to enable the vehicle to return toward the traveling allowable range R, when the vehicle rectifies the traveling direction of the vehicle into the direction toward the traveling allowable range R, even in a case where the vehicle once deviates from the traveling allowable range R and where regulation is imposed on the traveling of the vehicle. Therefore, the vehicle is enabled to return to the traveling allowable range R promptly.

In addition, the traveling regulation device 10 implements the predetermined warning operation on determination that the present position of the vehicle deviates from the traveling allowable range R. The present configuration enables a driver of the vehicle to recognize that the vehicle is traveling while deviating from the traveling allowable range R. In addition, the traveling regulation device 10 continues the warning operation until the present position of the vehicle moves into the traveling allowable range R, that is, until the vehicle returns into the traveling allowable range R. The present configuration enables the driver of the vehicle to recognize that the vehicle deviates from the traveling allowable range R by the warning operation being continued. In addition, the present configuration enables the driver of the vehicle to recognize that the vehicle has returned into the traveling allowable range R by termination of the warning operation.

As described above, the traveling regulation device determines whether the traveling direction of the vehicle is along the return direction, which is toward the predetermined range (traveling allowable range), when the present position of the vehicle deviates from the predetermined range (traveling allowable range). The traveling regulation device further regulates (restricts) traveling of the vehicle when the traveling direction is not along the return direction, that is, when the vehicle does not move toward the predetermined range (traveling allowable range). That is, according to the present embodiment, when the vehicle has deviated from the predetermined range (traveling allowable range), regulation is imposed on traveling of the vehicle selectively on condition that the vehicle does not move toward the predetermined range (traveling allowable range), exclusively from the condition that the vehicle moves toward the predetermined range (traveling allowable range).

In addition, even when the vehicle has deviated from the predetermined range (traveling allowable range), regulation is not imposed on traveling of the vehicle on condition that the vehicle moves toward the predetermined range (traveling allowable range). The present configuration does not impose regulation on traveling of the vehicle, even when the vehicle has deviated from the predetermined range (traveling allowable range), as long as the vehicle is moving toward the predetermined range (traveling allowable range). Thus, the present configuration enables the vehicle to return to the predetermined range (traveling allowable range) promptly.

The above structures of the embodiments can be combined as appropriate. The above processings such as calculations and determinations are not limited being executed by the control unit 11. The control unit may have various structures including the control unit 11 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicular traveling regulation device comprising:
  a present position detection unit configured to detect a present position of a vehicle;

a traveling direction detection unit configured to detect a traveling direction of the vehicle;

a position determination unit configured to determine whether the present position, which is detected by the present position detection unit, deviates from a predetermined range;

a direction determination unit configured to determine whether the traveling direction, which is detected by the traveling direction detection unit, is along a return direction, which is toward the predetermined range, on determination of the position determination unit that the present position deviates from the predetermined range, wherein the direction determination unit is configured to determine that the traveling direction is along the return direction in a case where the predetermined range exists on an extension line extending from the present position in the traveling direction; and a traveling regulation unit configured to regulate traveling of the vehicle on determination of the direction determination unit that the traveling direction is not along the return direction.

2. The vehicular traveling regulation device according to claim 1, wherein
the direction determination unit is further configured to determine that the traveling direction is along the return direction, in a case where
the present position moves toward the predetermined range.

3. The vehicular traveling regulation device according to claim 1, wherein
the direction determination unit is further configured
to determine whether the traveling direction, which is detected by the traveling direction detection unit when the position determination unit determines that the present position deviates from the predetermined range, is along the return direction or
to determine whether an average direction, which is an average of a plurality of traveling directions, which are detected by the traveling direction detection unit after the position determination unit determines that the present position deviates from the predetermined range, is along the return direction.

4. The vehicular traveling regulation device according to claim 1, wherein the traveling regulation unit is further configured to release regulation imposed on traveling of the vehicle, on determination of the direction determination unit that the traveling direction is along the return direction.

5. The vehicular traveling regulation device according to claim 1, further comprising:

a warning operation unit configured to implement a predetermined warning operation on determination of the position determination unit that the present position deviates from the predetermined range.

6. The vehicular traveling regulation device according to claim 5, wherein the warning operation unit is further configured to continue the warning operation until the present position moves to be included in the predetermined range.

7. The vehicular traveling regulation device according to claim 1, wherein the direction determination unit is further configured to determine that the traveling direction is along the return direction on determination that the predetermined range exists on the extension line.

8. The vehicular traveling regulation device according to claim 1, wherein the traveling regulation unit is further configured to regulate traveling of the vehicle by decelerating the vehicle or by de-activating an engine of the vehicle after elapse of a predetermined time subsequent to the determination.

9. A method for controlling a vehicle, the method comprising:

detecting a present position of the vehicle;

detecting a traveling direction of the vehicle;

determining whether the detected present position deviates from a predetermined range;

determining whether the detected traveling direction is along a return direction, which is toward the predetermined range, on determination that the present position deviates from the predetermined range;

determining that the traveling direction is along the return direction in a case where the predetermined range exists on an extension line extending from the present position in the traveling direction; and regulating traveling of the vehicle on determination that the traveling direction is not along the return direction.

10. A non-transitory computer readable medium comprising instructions executed by a computer, the instructions including the method according to claim 9.

11. The method according to claim 9, wherein the determining that the traveling direction is along the return direction is made on determination that the predetermined range exists on the extension line.

12. The method according to claim 9, wherein the regulating includes decelerating the vehicle or by de-activating an engine of the vehicle after elapse of a predetermined time subsequent to the determination.

* * * * *